May 14, 1940. F. G. CORNELL, JR 2,200,355
HEAT EXCHANGE DEVICE
Filed July 28, 1932 2 Sheets-Sheet 1
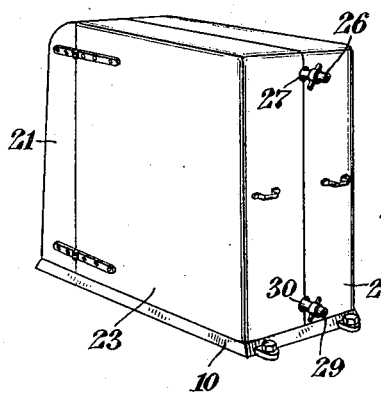
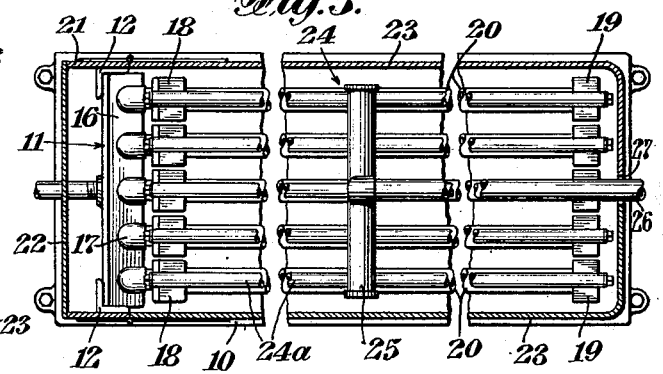
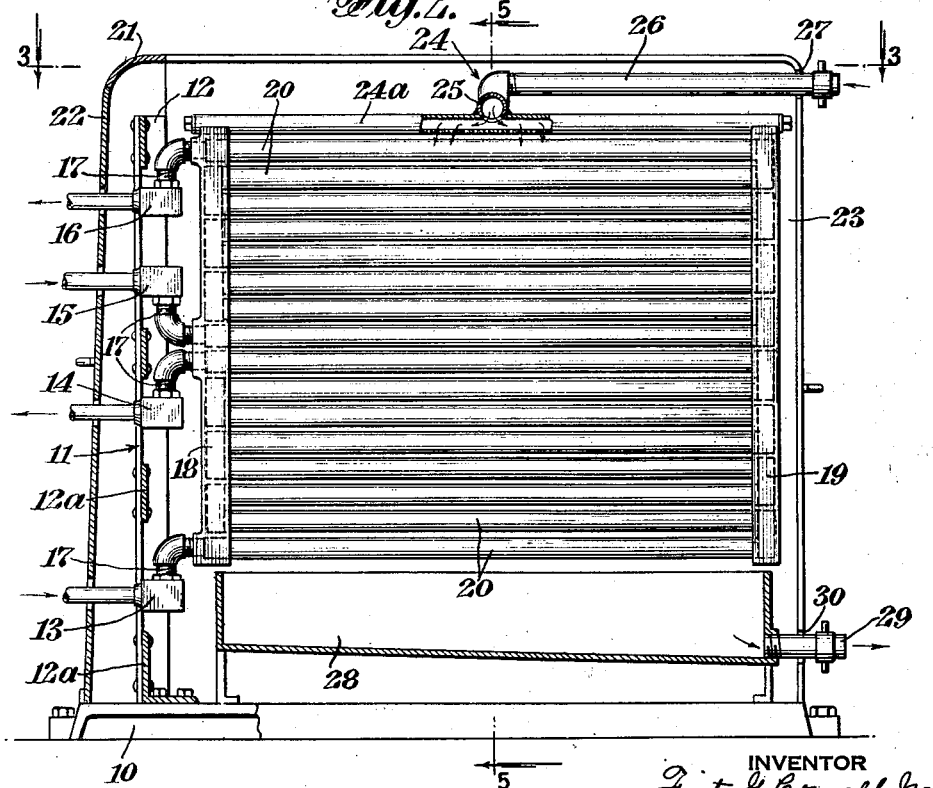
INVENTOR
Fritz G. Cornell Jr
BY
Kenyon & Kenyon
ATTORNEYS

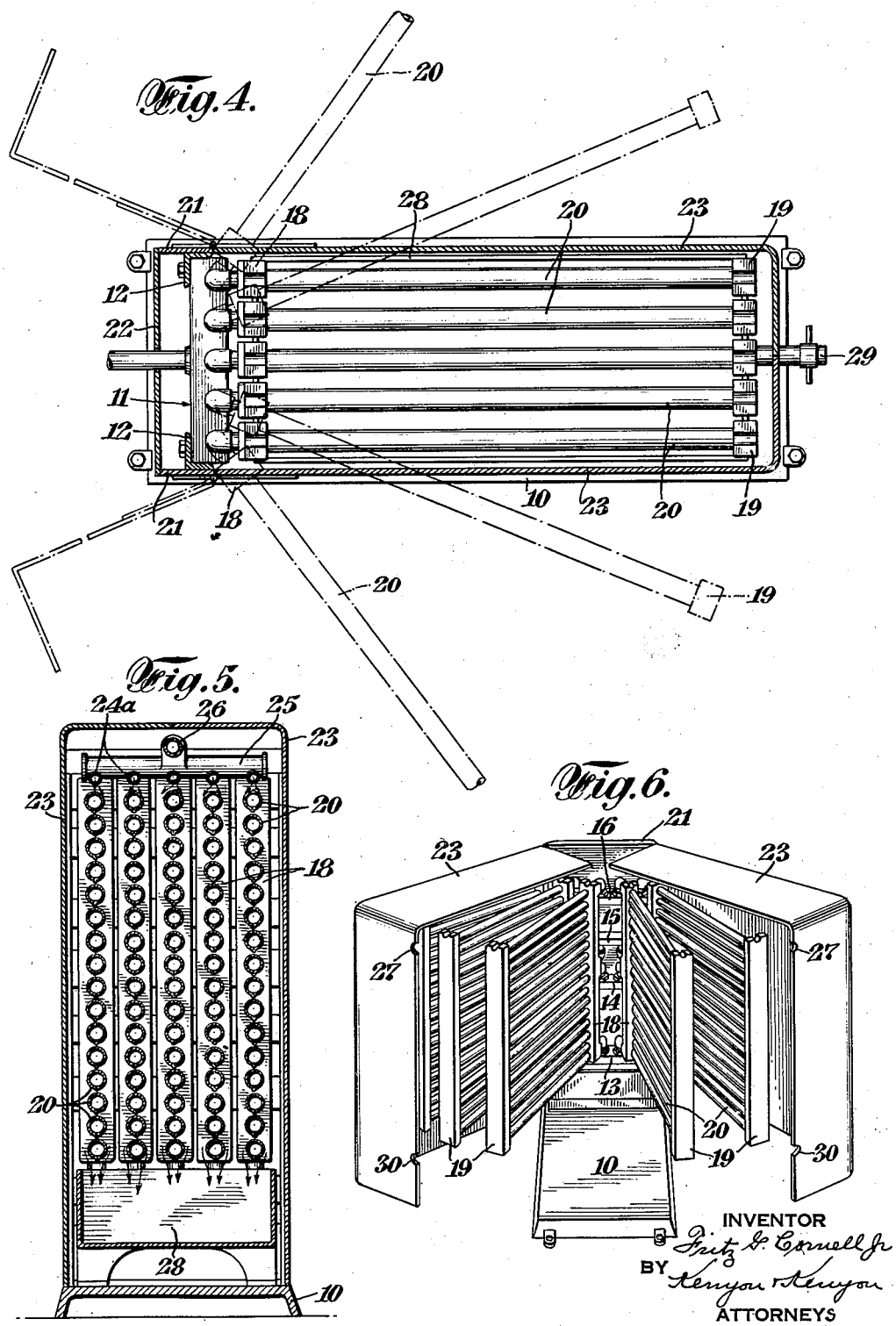

Patented May 14, 1940

2,200,355

UNITED STATES PATENT OFFICE 2,200,355

HEAT EXCHANGE DEVICE

Fritz G. Cornell, Jr., Mountain Lakes, N. J., assignor to Jensen Creamery Machinery Company, Inc., Bloomfield, N. J., a corporation of New York Application July 28, 1932, Serial No. 625,431

4 Claims. (Cl. 257—184)

This invention relates to heat exchange devices and more especially to devices for attemperating dairy products such as milk, cream and the like. In such devices, it is essential that provision be made for ready accessibility to all surfaces with which the treated product comes in contact in order that such surfaces may be cleaned after each operation of the device.

An object of this invention is a compact large capacity attemperating device in which the contact surfaces are completely enclosed during operation, but are easily and quickly accessible for cleaning.

A device embodying the invention comprises a plurality of heat exchange units normally arranged in parallel relation and pivotally mounted at one end so that they may be swung apart into fan-like relation when the device is not in use, thereby affording access to the entire surface of each unit. A casing is provided for completely enclosing the units when in parallel relation, this casing being composed of two sections to be swung into contacting relation to enclose the units or into spaced relation to expose the units and permit swinging of the same into fan-like relation for cleansing. Means are provided for flowing liquid to be attemperated downwardly over the heat exchange units and collecting the attemperated liquid as it drops from the heat exchange units. This device provides large contact area in a compact structure and combines therewith easy accessibility of all parts for cleaning purposes and complete protection against contamination of the liquid attemperated while passing over the device.

Other objects, novel features and advantages of this invention will be apparent from the following specification and accompanying drawings, wherein Figure 1 is a perspective view of the device in closed condition;

Fig. 2 is a vertical section through the device;

Fig. 3 is a section on the line 3—3 of Fig. 2;

Fig. 4 is a view similar to Fig. 3 with the liquid distributing means removed;

Fig. 5 is a section on the line 5—5 of Fig. 2; and

Fig. 6 is a perspective view of the device in partly open condition.

A rectangular base 10 supports near one end a vertical frame 11 comprising uprights 12 between which extend cross bars 12ª and horizontal headers 13, 14, 15 and 16. A plurality of heat exchange units are pivotally supported by said headers through the medium of swivel connections 17. Each unit consists of a pair of vertical headers 18 and 19 joined by horizontal tubes 20, the swivels 17 being connected to the headers 18. Normally, the heat exchange units are in parallel relation as shown in Fig. 3 and in full lines in Fig. 4, but by means of the swivel connections, the heat exchange units may be swung apart into the fan-like relation shown in Fig. 6 and in dotted lines in Fig. 4 to make the various units accessible for cleaning. The swivel connections 17 also constitute ducts for circulating cooling or heating fluid through the heat exchange units.

A casing is provided for enclosing the heat exchange units when in parallel relationship. This casing comprises a hood 21 attached to the frame 11 and closed by a removable plate 22. A pair of covers 23 are hinged to the hood 21 and complete the casing. The upper ends of the two covers are turned inwardly to form the top for the casing, while the vertical ends are likewise turned inwardly to form the end wall of the casing. Normally, the covers are arranged in contacting position to completely enclose the heat exchange units and are swung back into open position when it is desired to have access to the heat exchange units for cleaning the same.

Above the heat exchange units there is provided a distributor 24 which comprises a plurality of parallel pipes 24ª, which are in communication with a cross pipe 25. The pipes 24ª are received in recesses in the tops of the headers 18 and 19, thereby insuring vertical alinement between the pipes and the heat exchange sections. A supply pipe 26 is connected to the cross pipe 25 and extends out of the casing through an aperture formed by coacting recesses 27 in the end portions of the covers 23. Beneath the exchange units there is provided a collecting trough 28 which is removably supported on the base 10. An outlet pipe 29 extends from the trough 28 through an aperture formed by recesses 30 provided in the end portions of the covers 23.

The headers 18 and 19 are divided into upper and lower sections, the lower sections being in communication with the distributors and collector headers 13 and 14 through swivels 17 and the upper sections being in communication with the distributor and collector headers 15 and 16 through swivels 17 so that different cooling or heating fluids may be circulated through the sections. When used as a cooler, water is usually circulated through the upper section and brine, chilled water, or ammonia through the lower section by means of suitable connections between sources of supply and the distributor and collector headers.

In operation of the apparatus, milk or other liquid to be treated is supplied to the distributor arranged on top of the heat exchange units and trickles down over the tubes and is collected in the trough 28 and discharged through the pipe 29. Cooling fluids are supplied as a rule to the distributors 13 and 15 and delivered to the heat exchange units through the bottom swivel connections 17 and discharged from said units through the upper swivel connections 17 into the collectors 14 and 16 and then discharged through the outlet pipes.

After a run has been completed, the apparatus may be easily and quickly cleaned. The covers 23 are swung into open position (Fig. 6), and the distributor and the trough removed. The heat exchange sections are then swung into fan-like relation, thereby giving complete access to each unit for cleaning. The connections for supplying the cooling fluids to the heat exchange sections are not touched, and it is unlikely that any of the cooling fluid will drip out from the sections. No tools are required for bringing the heat exchange sections into fan-like relation and this operation can be quickly and easily effected by unskilled workmen. The removal of the trough 28 clears the base 10 and gives standing room for the operator, and the removal of the distributor 24 gives the operator ample headroom. The parallel arrangement of the several heat exchange sections when in operative position provides a large contact area in a small space. The swivel connections by which the heat exchange units are supported from the distributor and collector permit quick and easy movement of the different sections into position to give access to all parts of the units for cleaning, without any disconnection between the heat exchange units and the headers 13, 14, 15, 16, thus effectively minimizing leakage of cooling fluid from the apparatus.

It is understood, of course, that various modifications may be made in the structure above described, without in any way departing from the spirit of the invention as defined in the appended claims.

I claim:

1. In a device of the character described, a frame, a plurality of vertical heat exchange units, means for pivotally supporting said units from said frame, said units being swingable into parallel relation and into fan-like relation, a pair of covers attached to said frame and formed to enclose said units, said covers being movable to expose said units and permit swinging of the units into fan-like relation, a distributor above said units, a trough arranged below said units, and supply and discharge pipes for said distributor and trough extending through apertures formed by opposed recesses in the edges of said covers.

2. In a device of the character described, a base, a frame mounted on said base, a plurality of heat exchange units, means for pivotally supporting said units from said frame, said units being swingable into parallel relation or into fan-like relation, a pair of covers hinged to said frame and formed to enclose said units, said covers being swingable from each other to expose said units and permit swinging of the units into fan-like relation, a distributor above said units, a trough mounted on said base below said units, and supply and discharge pipes for said distributor and trough extending through apertures formed by opposed recesses in the edges of said covers.

3. In a device of the character described, a plurality of vertical heat exchange units supported for movement into and out of close operative relation, an enclosure for said units comprising members movable to permit movement of said units out of operative relation and a distributor resting on the upper ends of said units when in operative relation and having rows of apertures in alinement with said units.

4. In a device of the character described, a plurality of vertical heat exchange units mounted for swinging movement into parallel relation or into fan-like relation, an enclosure for said units comprising members movable to permit movement of said units from parallel relation into fan-like relation, and a distributor resting on the upper ends of said units when in parallel relation and having rows of apertures in vertical alinement with said units.

FRITZ G. CORNELL, Jr.